United States Patent
Kong et al.

(10) Patent No.: US 12,435,168 B2
(45) Date of Patent: Oct. 7, 2025

(54) HIGH DUCTILITY, HIGH MODULUS AND PHTHALATE FREE IMPACT RESISTANT PROPYLENE COPOLYMER

(71) Applicant: Formosa Plastics Corporation, U.S.A., Livingston, NJ (US)

(72) Inventors: Gapgoung Kong, Sugarland, TX (US); Chih-Jian Chen, Port Lavaca, TX (US); Min-Chi Hsieh, Port Lavaca, TX (US); Lei Zhang, Port Lavaca, TX (US); Cyrus C. Y. Lee, Victoria, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 614 days.

(21) Appl. No.: 17/931,212

(22) Filed: Sep. 12, 2022

(65) Prior Publication Data
US 2024/0109988 A1    Apr. 4, 2024

(51) Int. Cl.
| | |
|---|---|
| *C08F 210/16* | (2006.01) |
| *C08F 210/06* | (2006.01) |
| *C08L 23/16* | (2006.01) |
| *B01J 31/02* | (2006.01) |
| *C08F 2/24* | (2006.01) |

(52) U.S. Cl.
CPC .......... *C08F 210/06* (2013.01); *C08F 210/16* (2013.01); *C08L 23/16* (2013.01); *B01J 31/0204* (2013.01); *B01J 31/0249* (2013.01); *C08F 2/24* (2013.01); *C08F 2500/30* (2021.01); *C08F 2800/20* (2013.01); *C08K 2201/019* (2013.01); *C08L 2207/02* (2013.01); *C08L 2314/02* (2013.01)

(58) Field of Classification Search
CPC .............. C08F 210/16; C08F 2500/30; C08F 2800/20; C08F 2/34; C08L 23/16; C08L 2207/02; C08L 2314/02; B01J 31/0249; B01J 31/0204; B01J 31/0205
See application file for complete search history.

(56) References Cited

U.S. PATENT DOCUMENTS

| | | | | |
|---|---|---|---|---|
| 6,399,707 | B1 * | 6/2002 | Meka | C08L 23/10 525/240 |
| 7,348,381 | B2 * | 3/2008 | Bodiford | C08F 210/16 526/348 |
| 8,044,135 | B2 * | 10/2011 | Doufas | C08F 255/02 525/88 |
| 8,529,821 | B2 * | 9/2013 | Walia | C08L 23/10 524/451 |
| 9,309,334 | B2 * | 4/2016 | Meka | C08F 210/06 |
| 9,815,920 | B1 * | 11/2017 | Kong | C08F 110/06 |
| 10,465,025 | B2 * | 11/2019 | Lin | C08L 23/14 |
| 2005/0009991 | A1 * | 1/2005 | Meka | C08L 23/16 525/240 |
| 2020/0316575 | A1 * | 10/2020 | Kong | C08F 4/6494 |
| 2021/0102011 | A1 * | 4/2021 | Kong | C08F 4/52 |
| 2023/0143086 | A1 * | 5/2023 | Kong | C08F 4/6592 526/107 |

OTHER PUBLICATIONS

International Preliminary Report on Patentability for PCT No. PCT/US2022/076283 mailed Sep. 12, 2022, The International Bureau of WIPO.

* cited by examiner

*Primary Examiner* — Rip A Lee
(74) *Attorney, Agent, or Firm* — Spencer Fane, LLP

(57) ABSTRACT

The present invention provides phthalate free impact resistant polypropylene copolymer and methods of preparation, which are produced directly from the polymerization reactor system without further compounding of components which significantly alters the physical properties of the resulting polymer. The copolymer according to the present invention possesses both low temperature ductility and high flexural modulus, wherein said polymer is produced in the presence of a phthalate free ZN catalyst comprising urea component.

6 Claims, No Drawings

HIGH DUCTILITY, HIGH MODULUS AND PHTHALATE FREE IMPACT RESISTANT PROPYLENE COPOLYMER

BACKGROUND

The present invention relates to a phthalate free impact propylene copolymer composition and preparation methods. More particularly, this invention relates to phthalate free polypropylene copolymers having low temperature impact ductility and high flexural modulus. Polymers made in accordance with the present invention possess physical properties that were previously only achievable through post-reactor processing steps, which typically include blending with other polymeric materials. The compositions obtained according to present invention are further characterized by an excellent impact resistance/rigidity balance.

Impact resistant propylene polymer compositions are very well known in the art. Typically, they comprise a relatively high crystalline propylene polymer fraction and a relatively low crystalline copolymer fraction, where the relatively high crystalline fraction is generally a propylene homo-polymer characterized by high isotacticity. The relatively low crystalline fraction is generally a propylene copolymer and particularly a propylene-ethylene copolymer having an ethylene content ranging from 15 to 75% wt. The prior art compositions can be prepared by several methods, including the mechanical blending of the two polymer components. The preferred method, however, is the in-reactor preparation by a sequence of polymerization steps carried out in one or two reactors. Usually, in the first step propylene is homopolymerized or copolymerized with a small amount of other olefins in order to produce the high crystalline fraction, while in a second step carried in a reaction mixture comprising a higher amount of olefin co-monomer. This method is primarily what is used industrially and it is preferably carried out in two different reactors which can operate according to the same or different polymerization technology. In particular, the first stage can be carried out in a liquid phase reactor or in a gas-phase reactor, while the second step is commonly carried out in a gas-phase reactor in order to avoid the dissolution of the low crystalline fraction in the reaction bath.

In this prior art process, the performance of the catalyst is very important. The catalyst system in fact should be able to produce highly isotactic propylene (co)polymer in the first step, while in the second should be able to produce a copolymer in which the olefin co-monomer units are sufficiently distributed along and among the polymer chains in order to have a copolymer with low crystallinity that confers impact resistance to the polymer composition. The catalyst is also required to have a high polymerization activity, as it is important to have sufficient activity in the second stage of (co) polymerization in order to maintain acceptable level of plant productivity. Due to the presence of multiple polymerization steps and the fact that a certain weight balance among the two polymer fractions must be kept, the catalyst must be able to maintain the necessary level of reactivity in the second stage gas-phase polymerization step, which is critical as the reactivity in the gas-phase is related to the amount of low crystalline copolymer and thus the amount of crystalline polymer matrix for a given balance of properties. If the reactivity in the gas phase is too low, the productivity of first polymerization stage should be depressed in order to get the compositional target.

As such, it is desired to having a catalyst with improved second stage gas-phase reactivity. There have been many attempts to produce high impact resistant propylene polymer. For example, U.S. Pat. No. 7,348,381 disclosed a polyolefin having high flexural modulus and low temperature ductility produced by a catalyst containing internal donors of phthalate and 1,3-diether. U.S. Publ. App. 2010/0016510 disclosed heterophasic polypropylene (co)polymers having high melt flow with good stiffness.

Meanwhile, there had been growing demand for phthalate free polypropylene (co)polymers due to environmental safety concerns. U.S. Pat. Nos. 9,068,928 and 9,068,029 disclose impact resistant propylene polymers produced by a phthalate free catalyst containing internal donors comprising a magnesium halide, titanium compound having succinate, and 1.3-diether as internal donors.

Recently, co-owned and co-pending U.S. Publ. App. 2021/0101211, which is incorporated by reference in it entirety, discloses phthalate free catalyst components for propylene polymer that are produced by contacting magnesium ethoxide with titanium halide in the presence of internal donors comprising urea, carbonate ether, and 1,3-diether, producing polymers having high flexural modulus with high melt flow, but does not teach or describe the preparation of a phthalate free impact resistant propylene (co)polymer.

SUMMARY OF INVENTION

The present invention provides a phthalate free propylene impact (co) polymer composition having low temperature impact ductility and high flexural modulus, in which the preparation of said co-polymer is carried out in the presence of a phthalate free catalyst system comprising (a) phthalate free catalyst component obtained by contacting a magnesium halide, a titanium compound having at least a Ti-halogen bond and one or more electron donor compounds comprising urea, a carbonate ether, and a 1,3-diether; (b) an alkyl aluminum compound; and optionally (c) an external electron donor compound.

The one or more electron donor compounds comprising urea is preferably represented by Formula I:

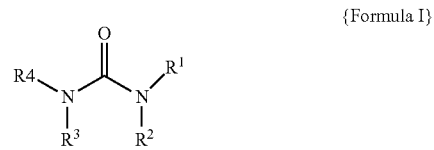

{Formula I} wherein $R^1$, $R^2$, $R^3$, and $R^4$, which may be identical or different, are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms. Two or more of $R^1$, $R^2$, $R^3$, and $R^4$ may be linked to form one or more saturated or unsaturated monocyclic or polycyclic rings.

A method of producing a phthalate free propylene impact (co) polymer comprises the following steps: (1) first, in a gas phase or bulk propylene liquid phase reactor, in the optional presence of ethylene, producing a propylene (co)polymer having at least 85% by weight of insolubles in xylene at 25° C.; and (2) in a successive step, polymerization is carried out in the gas-phase, in the presence of a mixture of propylene and ethylene, to produce an propylene impact copolymer.

DETAILED DESCRIPTION OF INVENTION

In a preferred embodiment of present invention, polypropylene impact (co)polymers are produced using a catalyst system comprising a phthalate free Zeigler-Natta (ZN) catalyst component (a), alkylaluminum component (b), and optionally an external electron donor component (c). The phthalate free ZN catalyst components (a) are produced using well known techniques by contacting titanium chloride with magnesium ethoxide in the presence of internal electron donors comprising 1,3-diether, carbonate ether, and urea compounds.

The one or more electron donor compounds comprising urea is preferably represented by Formula I:

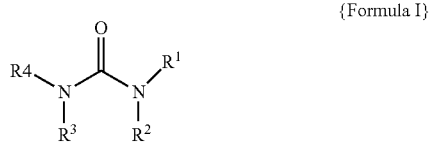

{Formula I} wherein $R^1$, $R^2$, $R^3$, and $R^4$, which may be identical or different, are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms. Two or more of $R^1$, $R^2$, $R^3$, and $R^4$ may be linked to form one or more saturated or unsaturated monocyclic or polycyclic rings.

Examples of 1,3-diether compounds include, but are not limited to: 2-(2-ethylhexyl)1,3-dimethoxypropane, 2-isopropyl 1,3-dimethoxypropane, 2-butyl-1,3-dimethoxypropane, 2-sec-butyl-1,3-dimethoxypropane, 2cyclohexyl-I,3-dimethoxypropane, 2-phenyl-1,3-dimethoxypropane, 2-tert-butyl-1,3dimethoxypropane, 2-cumyl-I,3-dimethoxypropane, 2-(2-phenylethyl)-I,3-dimethoxypropane, 2,2-diethyl-I,3-diethoxypropane, 2,2-dicyclopentyl-1,3-dimethoxypropane, 2,2-dipropyl-I,3-diethoxypropane, 2,2-dibutyl-1,3-diethoxypropane, 2-methyl-2-ethyl-1,3-dimethoxypropane, 2-methyl-2-propyl-I,3-dimethoxypropane, 2-methyl-2-benzyl-I,3-dimethoxypropane, 2,2diphenyl-I-dimethoxypropanc, 2,2-dibcnzyl-I,3-dimcthoxypropanc, 2-isopropyl-2cyclopentyl-I,3-dimethoxypropane, 2,2-bis(cyclohexylmethyl)-I,3-dimethoxypropane, 2,2-diisobutyl-I,3-diethoxypropane, 2,2-diisobutyl-I,3-dibutoxypropane, 1,I-bis(methoxymethyl)-7-(3,3,3-trifluoropropyl)indene, 1,1-bis(methoxymethyl)-7-trimethyisilylindene; 1,1-bis(methoxymethyl)-7-trifluoromethylindene, 1,1-bis(methoxymethyl)-4,7-dimethyl-4,5,6,7tetrahydroindene, 1,I-bis(methoxymethyl)-7-methylindene, 1,I-bis(methoxymethyl)-1Hbenz[e]indene, 1,I-bis(methoxymethyl)-1H-2-methylbenz[e]indene, 9,9bis(methoxymethyl)fluorene, 9,9-bis(methoxymethyl)-2,3,6,7-tetramethylfluorene, 9,9bis(methoxymethyl)-2,3,4,5,6,7-hexafluorofluorene, 9,9-bis(methoxymethyl)-2,3-benzofluorene, 9,9-bis(methoxymethyl)-2,3,6,7-dibenzofluorene, 9,9-bis(methoxymethyl)-2,7diisopropylfluorene, 9,9-bis(methoxymethyl)-1,8-dichlorofluorene, 9,9-bis(methoxymethyl)-2,7dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene, and 9,9bis(methoxymethyl)-4-tert-butylfluorene.

Examples of carbonate ether include, but are not limited to: (2-methoxyethyl) methyl carbonate, (2-ethoxyethyl) methyl carbonate, (2-propoxyethyl) methyl carbonate, (2-butoxyethyl) methyl carbonate, (2-(2-ethoxyethyloxy) ethyl) methyl carbonate, (2-benzyloxyethyl) methyl carbonate, (2-methoxypropyl) methyl carbonate, (2-ethoxypropyl) methyl carbonate, (2-methyl-2methoxybutyl) methyl carbonate, (2-methyl-2-ethoxybutyl) methyl carbonate, (2-methyl-2methoxypentyl) methyl carbonate, (2-methyl-2-ethoxypentyl) methyl carbonate, (I-phenyl-2methoxypropyl) methyl carbonate, (2-methoxyethyl) ethyl carbonate, (2-ethoxyethyl) ethyl carbonate Examples of urea compounds represented by Formula I include, but are not limited to: N,N,N',N'-tetramethylurea, N,N,N',N'tetraethylurea, N,N,N,N'-tetrapropyllurea, N,N,N'N'-tetrabutylurea, N,N,N'N'tetrapentylurea, N,N,N',N'-tetrahexylurea, N,N,N',N'-tetra(cyclopropyl)urea, N,N,N',N'tetra(cyclohexyl)urea, N,N,N',N'-tetraphenylurea, bis(butylene)urea, bis(pentylene)urea, N,N'dimethylethyleneurea, N,N'-dimethylpropyleneurea, N,N'-dimethyl(2-(methylaza)propylene)urea and N,N'-dimethyl(3-(methylaza)pentylene)urea. n-amyltriphenylurea, n-hexyltriphenylurea, noctyltriphenylurea, n-decyltriphenylurea, n-octadecyltriphenylurea, n-butyltritolylurea, n butyltrinaphthylurca; n-hcxyltrimcthylurca, n-hcxyltricthylurca, noctyltrimcthylurca, dihexyldimethylurea, dihexyldiethylurea, trihexylmethylurea, tetrahexylurea; n butyltricyclohexylurea, t-butyltriphenylurea; 1,1-bis(p-biphenyl)-3-methyl-3-n-octadecylurea; 1,1-di-n-octadecyl-3-t-butyl-3-phenylurea; I-p-biphenyl-1-methyl-3-noctadecyl 3 phenylurea; lmethyl-I-n-octadecyl-3 p-biphenyl-3-o-tolylurea; m-terphenyl-tri-t-butylurea, 1,3-dimethyl-2imidazolidinone, 1,3-diethyl-2-imidazolidinone, 1,3-dipropyl-2-imidazolidinone, 1,3-dibutyl-2imidazolidinone, 1,3-dimethyl-3,4,5,6-tetrahydro-2-pyrimidinone, N,N-dimethyl-N,N,diphenylurea, The alkyl aluminum compound (b) is preferably chosen among an aluminum alkyl having the formula $AIR_3$, where R is an alkyl having 1 to 8 carbon atoms, with the three R groups being the same or different. Examples of suitable aluminum alkyls are trimethyl aluminum (TMA), triethyl aluminum (TEAL) and triisobutyl aluminum (TIBAL). The preferred aluminum alkyl is TEAL.

Preferred external electron-donor compounds are silicon compounds having the formula $R^1R^2Si(OR^3)_a$, where a is an integer from 1 to 3, and where $R^1$, $R^2$ and $R^3$, are alkyl, cycloalkyl or aryl radicals with 1-18 carbon atoms optionally containing heteroatoms. Particularly preferred external electron-donor compounds are: methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1trifluoropropyl-2-ethylpiperidinyl-dimethoxysilane and 1,1,1trifluoropropyl-metil-dimethoxysilane. include silicon compounds include, withou limitation are Cyclohexylmethyldimethoxysilane; cyclohexylethyldimethoxysilane; isobutylisopropyldimethoxysilane; diphenyldimethoxysilane; isobutylisopropyldimethoxysilane; phenyltriethoxysilane; 3,3,3-trifluoropropylmethyldimethoxysilane; diisopropyldimethoxysilane; octylmethyldimethoxysilane; isobutyltrimethoxysilane; isobutyltriethoxysilane; npropyltrimethoxysilane; di-t-butyldimethoxysilane; cyclopentyl 1,I-dimethyl-2,2dimethylethyldimethoxysilane; and diamino silanes such as $(R_2N)_2Si(OCH_3)_2$, $(R_2N)_2Si(OCH_2CH_3)_2$ and (piperidinyl)$_2Si(OCH_3)_2$. The preferred molar ratio of the external donor to titanium in the ZN catalyst is about 5 to about 30, preferably about 8 to about 15, and most preferably about 10.

In the first polymerization step (1), the above catalyst components (a), (b) and optionally (c) are fed to a polymerization vessel containing liquid propylene or gas phase propylene in amounts such that the weight ratio (b)/(a) is in the range of 0.1-10, and, if the compound (c) is present, the weight ratio (b)/(c) is corresponds to the molar ratio described above. The first polymerization step can be carried out either in gas-phase or in liquid phase. The gas-phase process can be carried out in a fluidized or stirred, fixed bed reactor or in a gas-phase reactor comprising two interconnected polymerization zones, one zone working under fast fluidization conditions and the other zone in which the polymer flows under the action of gravity. The liquid phase process can be either in slurry, solution, or bulk (liquid monomer). The polymerization is generally carried out at temperatures between about 20° C. and about 120° C., preferably between about 40° C. and about 85° C. Hydrogen can be used as a molecular weight regulator.

In the subsequent polymerization step, the propylene/ethylene impact copolymer is produced in a gas-phase reactor in the presence of propylene, ethylene and the catalyst system described above. The polymer produced is preferably a propylene impact copolymer containing from 5 to 25% wt ethylene. The compositions obtained according to the process of the present invention can be obtained as reactor grade with a Melt Flow Rate value according to ISO 1133 (230° C., 2.16 Kg) ranging from about 0.01 to about 100 g/10 min, preferably from about 0.1 to about 70 g/10 min, and more preferably from about 0.2 to about 60 g/10 min.

EXAMPLES

The data of the propylene polymer materials were obtained according to the following methods:

Xylene-Soluble Faction: 2.5 g of polymer and 250 mL of o-xylene are introduced in a glass flask equipped with a refrigerator and a magnetic stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid are poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Heptane Insolubles (% HJ): The weight percent (wt %) of residuals of polypropylene sample after extracted with boiling heptane for 8 hours.

MFR (Melt flow rate): MFR was evaluated by melt indexer under condition of 230° C. with 2.16 kg total weight according to ASTM D1238. Sample mass: 5 grams.

Conditioning: Specimens are tested for tensile or flexural modulus within 40 to 96 hours according to ASTM D4101 section 12.1.5.

Tensile strength at break: Specimens are injection molded to ASTM Tensile bar type I, which has specimen dimensions 165 mm total length, width of narrow section 13 mm and 3.2 mm thickness. (speed). Tensile strength was measured according to ASTM D638-10.

Flexural Modulus: Specimens are injection molded to ASTM Tensile bar type I, using type/center section for a specimen dimensions of 127 mm×13 mm×3.2 mm. Flexural Modulus determination is performed at 23±2° C. and 50±10% RH, per ASTM D790 Method 1, procedure A, (speed) 1% Secant Mod.

Izod impact: Izod impact strength was measured according to ASTM D256.

Tg of rubber phase measurement: The glass temperature, Tg, of the rubber components was measured by Dynamic Mechanical Thermal Analysis (DMTA). The tests were done on an RSA G2 equipment in the three-point-bending configuration at a rate of 5° C./min and the frequency of 10 rad/sec.

Low temperature ductility: Low temperature ductility was measured according to ASTM D3763-08.

Phthalate Free Catalyst Component

As used herein, the TFC catalyst is a phthalate free catalyst component employing internal donors comprising 1,3-diether, carbonate ether and urea compounds in accordance with certain teachings of the present invention, and were produced via toll production in a commercial scale reactor. The catalyst composition analysis showed a Ti % of 1-5 wt %, a diether % of 1-15 wt %, a carbonate % of 1-15 wt % and a urea % of 0.5-10 wt %.

Continuous Gas Phase Polymerization—Preparation of Phthalate Free C2/C3 Impact Propylene Co-Polymer.

The polymerization run in the presence of catalyst system comprising TFC catalyst component, triethylaluminum, and silane external donor, is carried out in a continuous gas phase mode in a series of two reactors equipped with devices to transfer the product from one reactor to the other. The first and second reactors are preferably gas phase continuous reactors. A propylene homo-polymer is prepared in the first gas phase reactor while an ethylene/propylene copolymer is prepared in the second gas-phase reactor in the presence of the propylene homo-polymer from the first reactor. Hydrogen is used as molecular weight regulator. The gas phase (propylene, ethylene and hydrogen) is continuously analyzed via gas-chromatography. At the end of the run the product powder is discharged and dried under a nitrogen flow. The main polymerization conditions and the analytical data relating to the polymers produced in the two reactors are summarized in Table 1.

TABLE 1

Impact Copolymer produced from Continuous Gas phase polymerization

| | Propylene impact co-polymer | | | |
|---|---|---|---|---|
| | Example 1 | Example 2 | Comparative example 1 | Comparative example 1 |
| Catalyst | TFC | TFC | phthalate | phthalate |
| MFR (g/10 m) | 19 | 8.5 | 5.4 | 20 |
| Ethylene | 10.3 | 12.4 | 13.3 | 10.7 |
| Ethylene % in XS (Crytex QC) | 42 | 44 | 41 | 36 |
| XS (wt %) | 26.1 | 27.3 | 26.4 | 25.2 |
| Izod Impact @ 23° C. (ft-lb/in) | 12.1 | 14.6 | 14.2 | 11.6 |

TABLE 1-continued

Impact Copolymer produced from Continuous Gas phase polymerization

| | Propylene impact co-polymer | | | |
|---|---|---|---|---|
| | Example 1 | Example 2 | Comparative example 1 | Comparative example 1 |
| Flexural Modulus (Kpsi) | 140 | 129 | 123 | 134 |
| Tensile Elongation @ Yield | 5 | 5 | 6 | 6 |
| Tensile Strength @ Yield (psi) | 2600 | 2500 | 2620 | 2800 |
| Tensile Elongation @ Break | 308 | 348 | 391 | 303 |
| Tensile Strength @ Break | 2170 | 2220 | 2370 | 2250 |
| −30° C. Energy @ 6.7 m/s (J) | 52 ± 3 | 48 ± 3 | 52 ± 5 | 53 ± 2 |
| −30° C. Ductility @ 6.7 m/s | 100% | 100% | 100% | 100% |

As shown in Table 1, impact propylene copolymer produced by the TFC catalyst of the present invention, which does not contain any phthalate in its composition, demonstrates a high flexural modulus of 129-140 kpsi, low temperature (at −30° C.) ductility with composition of 26.1-27.3 wt % XS, and total ethylene % of 10.3-12.4%, which is comparable to a propylene polymer containing phthalate in its composition.

What is claimed is:

1. A phthalate free impact resistant polypropylene copolymer comprising a homopolymer portion and C2/C3 rubber portion interspersed therein;
    wherein the polypropylene copolymer has a flexural modulus value in a range of about 120 to 200 kpsi;
    wherein the polypropylene copolymer has 100% instrumented impact ductility at −30° C. and 6.7 m/s;
    wherein the polypropylene copolymer has a C2/C3 rubber content greater than 20% by weight; and
    wherein the polypropylene copolymer has a total ethylene content in a range of about 10 to 20 molar percent.

2. The polypropylene copolymer of claim 1, wherein the polypropylene copolymer has a flexural modulus value in the range of about 120 to 160 kpsi.

3. The polypropylene copolymer of claim 1, wherein the polypropylene copolymer has a C2/C3 rubber content in a range of about 20-30% by weight.

4. A process for producing a phthalate free impact resistant polypropylene copolymer comprising homopolymer portion and C2/C3 rubber portion interspersed therein, comprising:
    a) in a first polymerization step, polymerizing propylene in bulk or gas phase to produce a propylene homopolymer having at least 85% by weight of insoluble in xylene at 25° C.; and
    b) in a second polymerization step, polymerizing ethylene and propylene, in the presence of the propylene homopolymer from the first polymerization step, to produce the phthalate free impact resistant polypropylene copolymer;
    wherein the polypropylene copolymer has a flexural modulus value in a range of about 120 to 200 kpsi;
    wherein the polypropylene copolymer has 100% instrumented impact ductility at −30° C. and 6.7 m/s;
    wherein the polypropylene copolymer has a C2/C3 rubber content greater than 20% by weight; and
    wherein the polypropylene copolymer has a total ethylene content in a range of about 10 to 20 molar percent;
    wherein the second polymerization step occurs in the presence of a phthalate free Ziegler/Natta (Z/N) catalyst, wherein the Z/N catalyst comprises a urea component represented by Formula I:

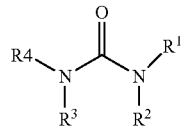

Formula I)

wherein $R^1$, $R^2$, $R^3$, and R4, which may be identical or different, are independently hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and R4 may be linked to form one or more saturated or unsaturated monocyclic or polycyclic rings.

5. The process of claim 4, wherein the process is carried out in the presence of a catalyst system comprising (a) a solid catalyst component produced by contacting titanium chloride with magnesium compounds in the presence of internal donors comprising a 1,3-diether compound, a urea compound, and carbonate ether compounds, (b) an aluminum alkyl, and, optionally (c) an external electron donor compound.

6. The process of claim 5, wherein the catalyst system comprises a 1,3-diether compound selected from the group consisting of: 2,2-diisobutyl-1,3-dimethoxypropane; 2-isopropyl-2-isopentyl-1,3-dimethoxypropane; and 2,2-bis(cyclohexylmethyl)-1,3-dimethoxypropane.

* * * * *